United States Patent
Schneider

(10) Patent No.: US 7,278,179 B2
(45) Date of Patent: Oct. 9, 2007

(54) INFLATABLE DECUBITIS MAT WITH VENT STRUCTURES CONTROLLED BY HEAT SENSORS

(75) Inventor: Edward T. Schneider, Eastlake, OH (US)

(73) Assignee: TCAM Technologies Inc., Mentor, OH (US)

( * ) Notice: Subject to any disclaimer, the term of this patent is extended or adjusted under 35 U.S.C. 154(b) by 133 days.

(21) Appl. No.: 10/531,202

(22) PCT Filed: Oct. 22, 2003

(86) PCT No.: PCT/US03/33240

§ 371 (c)(1), (2), (4) Date: Apr. 13, 2005

(87) PCT Pub. No.: WO2004/037149

PCT Pub. Date: May 6, 2004

(65) Prior Publication Data

US 2006/0010607 A1 Jan. 19, 2006

Related U.S. Application Data

(60) Provisional application No. 60/420,724, filed on Oct. 23, 2002.

(51) Int. Cl.
A47C 27/10 (2006.01)
A61G 7/057 (2006.01)

(52) U.S. Cl. ............................ 5/714; 5/713; 5/655.3; 5/423

(58) Field of Classification Search .................... 5/714, 5/713, 710, 655.3, 644, 600, 706, 654, 421, 5/423
See application file for complete search history.

(56) References Cited

U.S. PATENT DOCUMENTS

| | | |
|---|---|---|
| 3,667,073 A | 6/1972 | Renfroe |
| 3,828,378 A | 8/1974 | Flam |
| 4,280,487 A | 7/1981 | Jackson |
| 4,347,633 A | 9/1982 | Gammons et al. |
| 4,472,847 A | 9/1984 | Gammons et al. |
| 4,706,313 A | 11/1987 | Murphy |
| 4,768,251 A | 9/1988 | Baskent |
| 4,788,730 A | 12/1988 | Bexton |
| 4,944,060 A | 7/1990 | Peery et al. |
| 4,945,588 A | 8/1990 | Cassidy et al. |
| 4,947,500 A | 8/1990 | Seiler |
| 5,001,793 A | 3/1991 | Liu |

(Continued)

FOREIGN PATENT DOCUMENTS

EP 579381 1/1994

(Continued)

Primary Examiner—Alexander Grosz
(74) Attorney, Agent, or Firm—Fay Sharpe LLP

(57) ABSTRACT

A decubitis mat includes a plurality of individual cells (16 which are pressurized by air. A polymer sensor/vent structure (20) is mounted on the top surface of each cell and defines a plurality of polymer filled channels (28) and a vent valve (26) which is biased to a closed position. As a body resting on the mat heats the polymer, it undergoes a phase change an expands, causing biasing forces (30) which bias the vent valve to open, permitting air in the cell to be released providing air flow to the body.

23 Claims, 3 Drawing Sheets

U.S. PATENT DOCUMENTS

| | | | |
|---|---|---|---|
| 5,010,608 A | 4/1991 | Barnett et al. | |
| 5,031,261 A | 7/1991 | Fenner | |
| 5,072,468 A | 12/1991 | Hagopian | |
| 5,201,780 A | 4/1993 | Dinsmoor, III | |
| 5,303,436 A | 4/1994 | Dinsmoor, III | |
| 5,394,577 A | 3/1995 | James et al. | |
| 5,511,260 A | 4/1996 | Dinsmoor, III | |
| 5,542,136 A | 8/1996 | Tappel | |
| 5,564,142 A | 10/1996 | Liu | |
| 5,619,764 A | 4/1997 | Lopau | |
| 5,652,987 A | 8/1997 | Fujita | |
| 5,815,864 A | 10/1998 | Sloop | |
| 5,926,884 A | 7/1999 | Biggie et al. | |
| 5,956,787 A | 9/1999 | James et al. | |
| 6,052,851 A | 4/2000 | Kohnle | |
| 6,085,372 A | 7/2000 | James et al. | |
| 6,154,907 A | 12/2000 | Cinquin | |
| 6,421,858 B1 | 7/2002 | Cuérel | |
| 6,442,780 B1 | 9/2002 | Phillips et al. | |
| 6,584,628 B1 | 7/2003 | Kummer et al. | |
| 6,591,437 B1 | 7/2003 | Phillips | |
| 6,598,251 B2 * | 7/2003 | Habboub et al. | 5/654 |
| 6,687,937 B2 * | 2/2004 | Harker | 5/726 |
| 6,855,158 B2 * | 2/2005 | Stolpmann | 607/108 |
| 2001/0020303 A1 | 9/2001 | Endo et al. | |
| 2001/0032365 A1 | 10/2001 | Sramek | |
| 2002/0073489 A1 | 6/2002 | Benedict et al. | |
| 2003/0000015 A1 | 1/2003 | Horlin | |

FOREIGN PATENT DOCUMENTS

| | | |
|---|---|---|
| EP | 1 240 852 A1 | 9/2002 |
| FR | 2 692 477 | 12/1993 |

* cited by examiner

INFLATABLE DECUBITIS MAT WITH VENT STRUCTURES CONTROLLED BY HEAT SENSORS

This application claims the benefit of provisional application 60/420,724, filed on Oct. 23, 2002 and is the national stage entry of PCT/US03/33240, filed on Oct. 22, 2003.

BACKGROUND OF THE INVENTION

The present invention relates to the cushion, mattress, seating, and related arts. It finds particular application in conjunction with decubitus mattresses and will be described with particular reference thereto. However, it is to be appreciated that the invention will also find application in conjunction with decubitus mats for beds and operating tables, cushions for wheelchairs, airplane seats, other types of chairs and seating, and the like.

Mattress and seat cushions improve the comfort of persons resting on them. However, the person typically moves regularly and shifts position to try to maintain full capillary blood flow to high contact pressure body areas. Restricted capillary flow can cause discomfort in healthy persons. Patients with compromised health often cannot move sufficiently to prevent the formation of decubitus ulcers, a form of tissue necrosis resulting from lack of nourishing blood flow.

Decubitus ulcers or other pressure sores are a significant problem for hospitals and nursing homes. Nursing homes estimate a 17-20% occurrence of pressure sores in their patients and hospitals estimate an occurrence over 11%.

Pressure ulcers result from the contact pressure of the body mass in contact with a support surface. The forces at the contact points with the environment generate stress in tissues, which may be called "pressure" if the force is perpendicular, or "shear" if the force is tangential to the tissue contact surface. The visco-elastic and micro-vascular properties of the tissue determines the response to these forces. Prolonged stress in the tissue collagen network above the capillary and lymphatic vessel region can result in occluded blood and interstitial fluid flow, ischema, pain, necrosis, and sloughing of dead tissue.

Decubitus ulcers most frequently occur in patients in hospital beds, on surgical tables, and in wheelchair seats. Surgical tables are often the most severe, because patients under deep anesthesia do not move to protect themselves from pressure points. Pressure ulcers can occur in as little as 5 minutes on a surgical table. Decubitus ulcers and pressure sores occur most frequently on the buttocks, back of the head, heels, and shoulders, where boney prominences in the body come into contact with the support surface. The orientation of the blood vessels relative to the load bearing skin surface determines the response of the vessel to the surface load. In general, major vessels and their branches are oriented either parallel or perpendicular to the skin surface. This pattern repeats for successive branches of the arterial and venous circulation. Vessels parallel to the surface collapse easily from pressure loads; whereas, vessels perpendicular to the surface bend and collapse from shear loads applied to the weight bearing tissue. Vessels most vulnerable to occlusion by shear stress are those penetrating through the interfaces between tissue planes. Externally, applied forces also change tissue contours. Blood flow to distal capillaries is impaired when capillaries collapse or occlude as the result of tissue layers that slip and vessels that bend between the tissue layers. Thus, both pressure and shear loads can cause this ischema and necrosis in the layers of the skin and subcutaneous tissues.

Although pressure and shear are primary factors leading to pressure ulcers, many other factors have also been identified, such as elevated tissue temperature, hydrated skin, duration of applied load, body posture, and tissue atrophy. These problems can be exaggerated by repeated stress, nutritional deficiencies, biochemical and enzyme activity changes, collagen degradation, and other factors.

Numerous decubitus mattress products have been proposed. Many provide only a limited reduction in pressure ulcers or under limited circumstances. Others are too expensive to be affordable and are not readily available. The prior mattresses include lambswool, low-tech foam, high-tech foam, gel-filled mattresses, air mattresses, oscillating air mattresses, and automatic patient tilting mattresses. Diagnostic aids have included the use of pressure sensitive polymer mats to generate a visual readout of the pressure points and pressure distributions. One design of an oscillating pressure mattress uses large tubes arrayed laterally across the mattress. The pressure in these tubes is modulated to oscillate very large body sections. Active or smart decubitus mattresses using high-tech computerized load-sensing devices, numerous sensors, microchips, computer controlled valves, air lines, and other high tech sensing and control components which identify high pressure areas and active re-contour the mat have been proposed. The large number of air bladders with their corresponding large number of electronic components permits a larger range of adjustment of patient contours than passive mattresses such as foams and gels. But, these designs are hardware intensive and are very costly. The high cost has inhibited placing active mattress in mass production so that they become readily available.

Despite much research and effort, a need still exists for an improved low-cost decubitus mat.

The present application provides an inexpensive, active decubitus mat which overcomes the above-referenced problems and others.

SUMMARY OF THE INVENTION

In accordance with one aspect of the present invention, a mat includes an array of individual air-filled bladders and a means responsive to body heat for adjusting air pressure in the individual bladders to adjust contact pressure individually in the bladders. The heat responsive means includes a heat sensor and vent structure mounted on an exposed surface of each bladder.

In accordance with another aspect of the present invention, a method of supporting a subject while reducing the potential for pressure ulcers is provided. The subject is supported on a plurality of air bladders, each of which is pressurized. A temperature at a potential contact point on each bladder is sensed and, responsive to the sensed temperature, the pressure in each bladder is adjusted. The pressure is adjusted in each bladder by venting the bladders, providing an air flow from the bladders along an underside of the subject to reduce pooled moisture.

One advantage of the present invention is that it actively senses and identifies high pressure areas that are highest risk areas for decubitus ulcers.

Another advantage of the present invention is that it automatically adjusts mat contour or pressure at the identifies high pressure areas.

Another advantage of the present invention resides in its low cost.

Another advantage of the present invention resides in its simplicity of manufacture.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
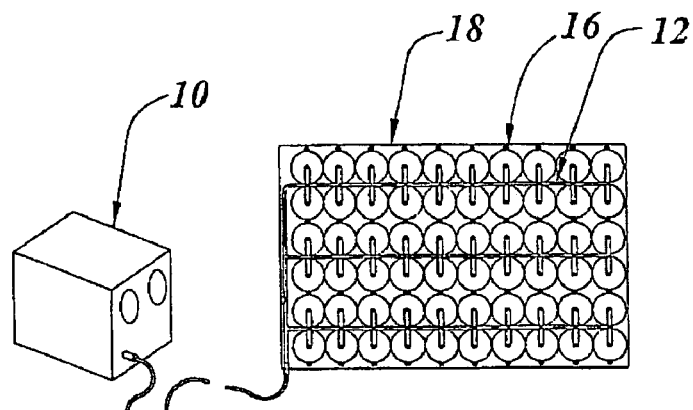
FIG. 1 is a diagrammatic view of an air mat in accordance with the present invention.
Figure 2:
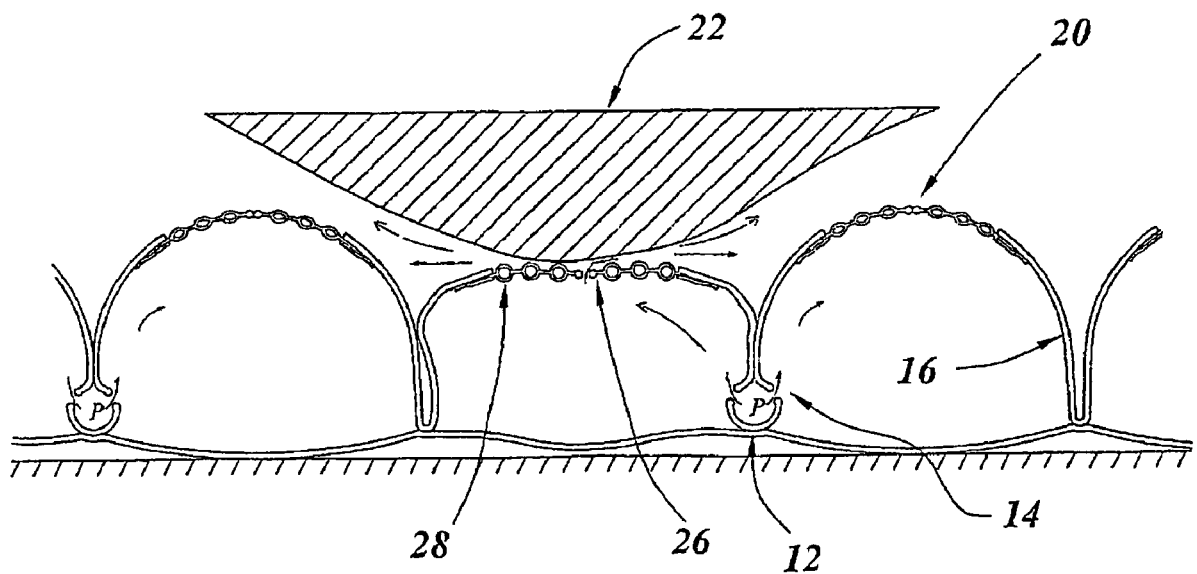
FIG. 2 is a sectional view through several cells of the mat of FIG. 1.

With reference to FIGS. 1 and 2, a remote air supply 10 supplies air at a pressure of 0.04-0.104 bar (0.5 to 1.5 psi) to an air pressure supply manifold which branches into individual air supply lines 12. Metering orifices 14 connect the air supply lines 12 with individual cells or pockets 16 of a decubitus mat 18. The cells or bladders 16 are preferably on the order of 2.5-10 cm in diameter when inflated and are constructed of a flexible elastomeric material.

The mat including the cells is preferably made of a membrane material or injection-molded materials such as vinyl. The mat can be fabricated by joining a rubber septum or a polymer valve to a membrane bladder. Membrane materials can be molded to make complex membrane and non-membrane assemblies, rubber septums can be co-molded into injection moldings, or sheet stock membrane material can be heat sealed to form the chambers.

Figures 3, 4, 5:
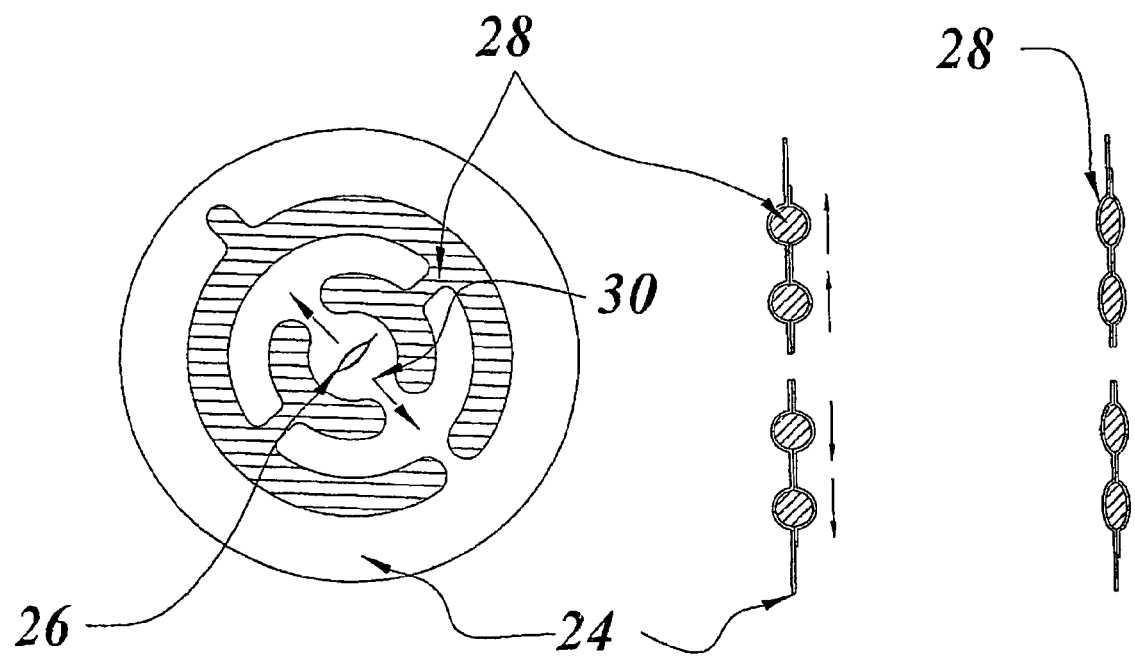
FIG. 3 is a top view of one of the vents and associated control of the mat of FIGS. 1 and 2.
FIG. 4 is a cross-sectional view through the polymer valve control elements of FIG. 3 in the valve closed position.
FIG. 5 is a cross-sectional view similar to FIG. 4, but with the valve open.
Figure 6:
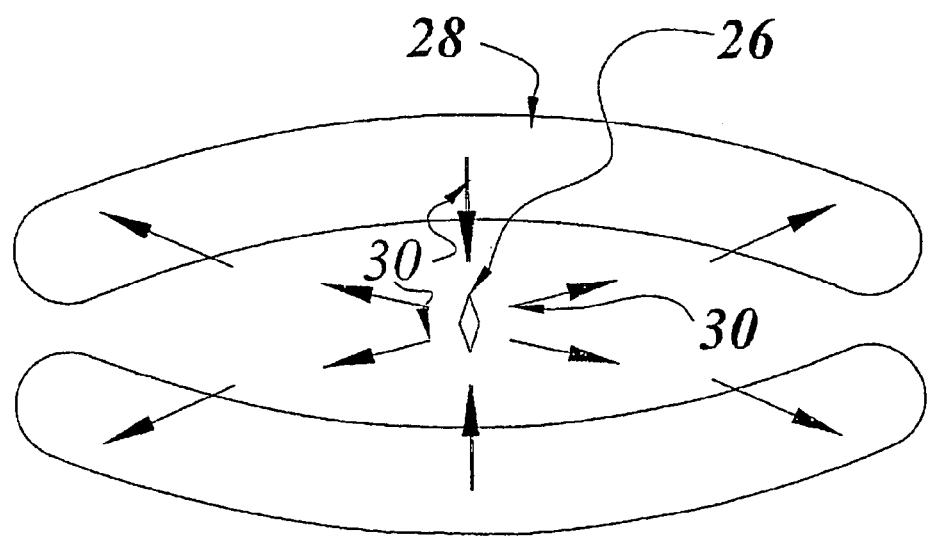
FIG. 6 is a diagrammatic illustration of stress vectors in a polymer sensor/vent control construction.

A polymeric sensor and vent 20 is mounted at the top of each cell. Preferably, the tops of the cells are domed such that the sensor/vent is at a point of initial contact with the cell by a body portion 22. With reference to FIGS. 3, 4, 5, and 6, each of the polymeric sensor vent constructions preferably includes a skirt portion 24 which is replaceably or permanently attached to a corresponding one of the cells 16. The skirt defines a vent aperture 26 which is self-biased to a relatively closed position. Adjacent the vent aperture, polymer-filled channels 28 are defined in a pattern which causes the vent 26 to be opened as the polymer warms. More specifically, in the cool configuration (FIG. 4), the polymer is contracted and the channels are generally flat and oval in cross-section. In a preferred embodiment, the polymer is in its contracted state at 21° C. (70° F.). As the polymer is warmed toward body temperature, the polymer expands forcing the channels into a more circular cross-section (FIG. 5) which increases the height of the channels and decreases their width. This causes stress vectors 30 on the skirt which urges the vent 26 to open. Preferably, the polymer is formulated and the channel sized such that the substantially round configuration of FIG. 5 is reached when the polymer reaches a temperature of about 32° C. (90° F.).

The polymers include ionomers, monomers, glycerine, copolymers; waxes, fatty acids, triglicerides, and other materials which behave as described, even if not typically called polymers in the trade. Polymers includes the use of gels both water-based and otherwise. Preferably, the polymer undergoes a solid/liquid phase change.

With reference again to FIG. 2, initially, the vent 26 is closed or least relatively restricted. Air flowing into the cells from the air lines 12 pressurizes the cells to a relatively high pressure, comparable to that of the air lines and the pressure supplied by the pressure supply 10. When a person lays or sits on the mat, the pressure points at which decubitus ulcers are apt to form press most firmly against the underlying cells. More specifically, the body primary contact portions contact the polymer sensor/vent 20 and warm the polymer in the channels 28 toward body temperature. As the polymer warms, it expands causing the vent to start opening. As the vent opens, air from within the cell escapes through the vent, depressurizing it, allowing that cell to collapse and adjoining cells to support surrounding areas of the body. After the cell collapses sufficiently that it pulls away from the body, the polymer starts to cool and contract. Portions of the body adjacent the initial projecting portion that come into contact with surrounding cells will start warming the polymer sensor vents of those cells as the first vent that has contracted away from the body portion during deflation starts to cool. When the polymer has cooled sufficiently that the valve orifice 26 starts to close, the cell starts to re-pressurize, coming back into contact with the overlying body portion. In this manner, the cells of the mat globally provide an active response which shapes the mat to the body shape.

In the preferred embodiment, the tubes or channels containing the thermally expanding polymer undergo up to about a 25% length change along the long or horizontal axis of the tube between the configuration of FIGS. 4 and 5. This contraction of the tube cross-section in combination with the geometry of the tube array creates tensile stresses in the membrane surrounding the vent opening. The tube contraction creates a secondary effect in the curved outer tube which urges the valve open. Pressurizing the curved tubes or channels creates forces which tend to reduce the tube curvature, analogous to the action of a Bourdon tube mechanism in a pressure gauge. This action generates a tensile load in the long axis of the tube and reduces tension in the membrane along the axis at right angles to the long axis. In this manner, the polymers act as a non-electrical automatic control system to selectively vent and depressurize cells under higher temperature at high pressure points and to pressurize unloaded cells at lower temperatures at lower pressure points.

Figure 7:
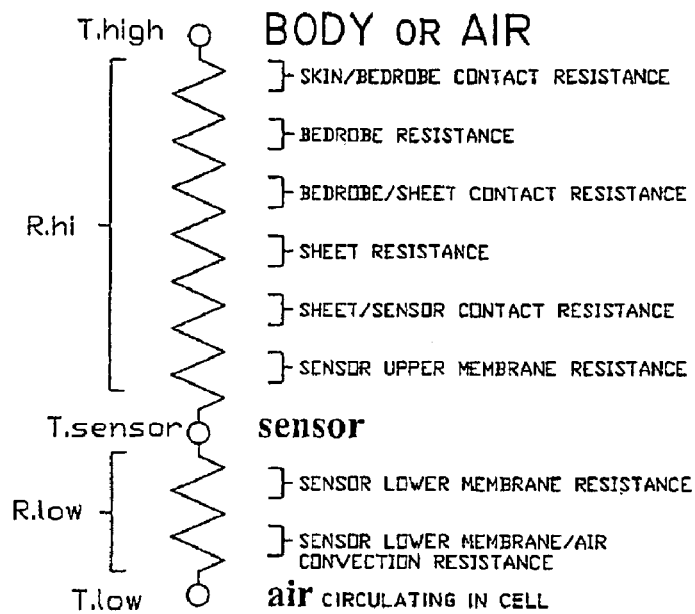
FIG. 7 is a diagrammatic illustration of thermal resistance.

Given a fixed body skin temperature and a fixed air temperature flowing into the cells from the air lines, e.g., 21° C. (70° F.), then the polymer can eventually reach a generally steady-state temperature somewhere in between. This steady-state temperature is a function of the thermal resistance above and below the polymer as illustrated in FIG. 7. The steady-state equilibrium temperature $T_{eq}$ of the polymer is computed through the following formula:

$$T_{eq} = T_{low} + (T_{high} - T_{low})(R_{low} \div (R_{low} + R_{high})).$$

This equation simply states that the sensor temperature is proportional to a ratio of the thermal resistance between the high and low temperatures of the body and the air. FIG. 7 illustrates multiple resistances in the heat transfer path from the body or high temperature source to the air in the cell or heat sink. Typical resistances above the sensor are pressure sensitive and their thermal resistance reduces with contact pressure. Typical resistances include contract resistances and fabric resistances. Contact resistances reduce as the materials are squeezed by increasing the effective contact area. Fabrics are composed of fibers separated by air gaps that reduce when the pressure on the fibers starts to increase their contact against each other. The reduction of these resistance factors with pressure raises the equilibrium temperature at the polymer, i.e., the temperature increases with increasing contact pressure.

A second action provided by the system is the emission of air flow through the vent valves under the patient's body. This air flow evaporates sweat and body fluid accumulations which have been identified as one of the contributing factors to the development of a decubitus ulcer.

A third action which the present mat achieves is a slowly oscillating or massaging action which is beneficial to treatment and prevention of pressure ulcers by stimulating blood flow in the capillaries.

Figure 8:
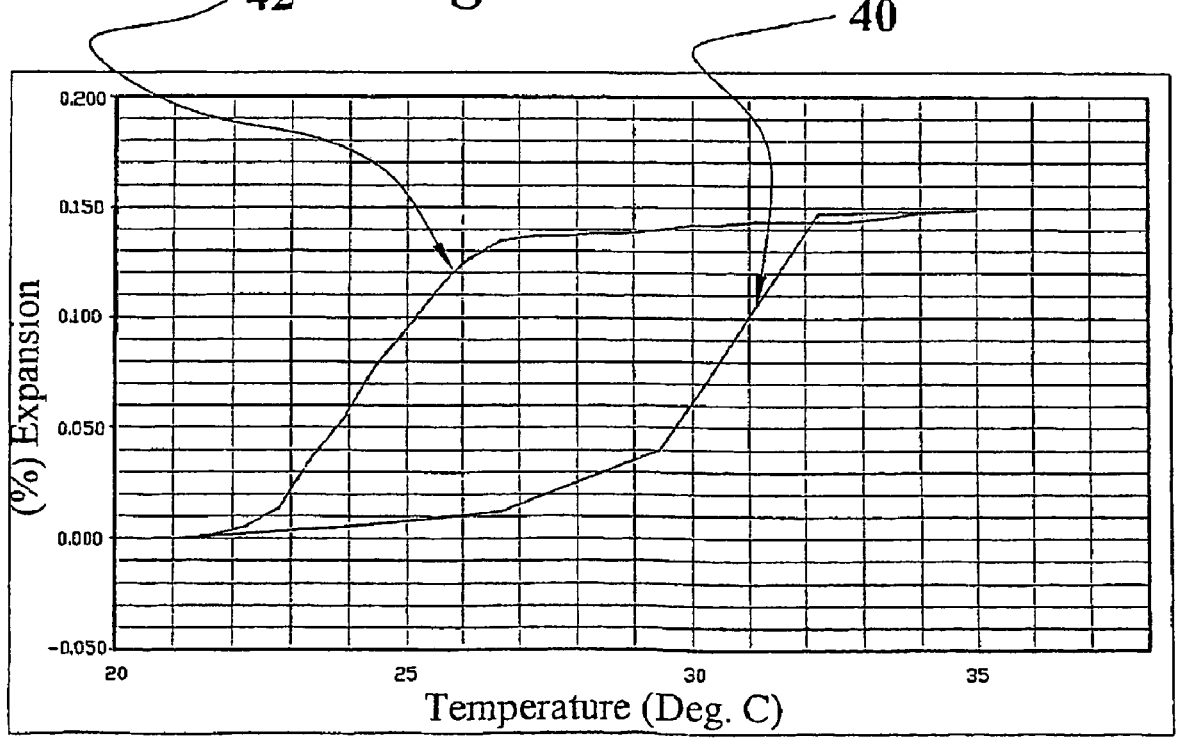
FIG. 8 is a graphical depiction of a volume versus temperature curve for a suitable valve controlling polymer.

With reference to FIG. 8, as a body portion comes into contact with one of the polymer sensor/vent structures 20, the polymer in the cell expands as illustrated, by curve 40. Preferably, the polymer undergoes a phase change from a solid or one-liquid phase at about 21° C. (70° F.) and reaches equilibrium at a second phase, such as liquid phase at about 32° C. (90° F.). Once the polymer has reached the second phase, it remains at substantially constant volume as it increases in temperature toward body temperature. As the polymer pulls away from the body, it cools along curve 42. The temperature difference between the expansion curve 40 and the contraction curve 42 can lead to overshoot situations which creates an advantageous massaging action. This massaging action is superimposed on the above-described first action of pressure equalization to give a combined action. This effect is created by designing the thermal circuit to create a meta-stable system in response to the heat source. This equation is a familiar property found in the differential equations of heat transfer, fluid mechanics, and electricity. There is a continuously transient (time varying) response that frequently manifests itself as a sinusoidal output. The electrical analog of this type of transient response is found in an electrical oscillator and is based on the RC tank circuits to set the time delays that are used to create and control the oscillations. This oscillating property is designed into the polymer sensor causing a constant inflation and deflation of the cells over a slow cycle. Specifically, the thermal properties of the materials and the dimensions used in the polymer control the cycle period and the frequency and amplitude of the oscillations.

Note the difference in the heating and cooling temperatures of the polymers moving between liquid and solid phases. Because the polymer heats and expands at a higher temperature than it cools and contracts, the cells tend to loose slightly too much pressure and reduce to a below equilibrium pressure and core height. Then after a cooling delay, the valve closes and the cell re-inflates to a slightly above equilibrium pressure before it is sufficiently heated to repeat the cycle. This slow over and under-inflation cycle interacts with the degree of contact between the body and adjacent cells adding to the cyclic oscillation of the surrounding cells. The heat capacity of the sensor polymer and the thermal resistance are key factors for controlling the oscillation rate and amplitude. The oscillation period is composed of two segments, the heating cycle and the cooling cycle. The thermal resistance factors, illustrated in FIG. 7 affecting the heating cycle are the combined thermal resistances controlling the positive heat transfer in the path from the body into the sensor minus the effective resistance in the negative heat transfer path from the sensor to the air in the cell. The thermal resistance factors in the cooling cycle are the thermal resistance through the twin paths from the sensor to the air inside the cell and the air outside of the cell.

The time delayed action of this sensor valve is created by two distinct heat transfer effects, and leads to the oscillating action of the cells. The first time delay is the time period required for sufficient heat to flow into the sensor polymer to create melting and volume expansion. The second time delay is generated by the time period needed for cooling the polymer across the temperature difference curves 40 and 42 in FIG. 8

Looking now to the sequence of oscillations, in an initial state in which the cell is cold and not in contact with the body, the polymer is contracted thereby closing the vent. The air supply lines supply air to build the pressure inflating the cell. At some point, the cell contacts the body and heat from the body begins to flow into the polymer sensor. There is a time lag for a sufficient quantity of heat to enter the sensor to raise its temperature sufficiently to expand the polymer. This expansion creates an increasing vent orifice size, slowing the cell inflation rate. When the vent has been opened sufficiently to tip the cycle into a decreasing cell pressure, the cell deflates and eventually falls free from body contact. At this point, all the membrane surfaces of the sensors are in contact with the 21° C. (70° F.) air. After a time lag, the sensor cools to the point that it contracts, again closing the vent sufficiently for the cell to begin inflating. The cell now begins a second inflation and oscillation cycle. This oscillation cycle can be controlled by adjusting the RC factors of the thermal circuit described above.

The design of the cell geometry of the mat controls shear forces acting on the patient's skin. Shear forces have also been implicated as a significant factor leading to decubitus ulcers in combination with the direct contact pressure. As illustrated in FIG. 2, the cells are relatively tall bladders which have little side wall strength relative to lateral movement. These weak walls are unable to impart large lateral forces to the body tissues during sliding movement of the body, which minimizes the magnitude of the final shearing forces on the skin.

In an alternate embodiment of the design, an inherently damped proportional system is created. The oscillating action discussed above is enhanced by the sharp contrast between skin contact and air contact and tends to create strong oscillations in the meta-stable state of continuous oscillation. This sharp change between low and high temperature sources tends to be a control that is generally described as a on/off or step function. A stable, inherently damped state can be achieved by a more proportional thermal resistance variation between the two extremes, allowing the cell to seek an equilibrium pressure state between the two extremes. This approach avoids overshoot by lowering the heat flux gradually as the equilibrium is approached. More specifically, this is accomplished by a layer of compressible open-celled foam or material whose thermal resistance drops smoothly, as opposed to a step function change, as it is compressed by pressure between the mat and the patient. Open-celled foams compress or close their internal voids under pressure, thereby improving thermal transfer. The use of foams or other materials whose thermal transfer characteristics vary with pressure can be used to reduce the oscillations or hold the cell pressurization at an equilibrium set point. In this manner, the sensor/vent structure can be tailored to a spectrum of performance characteristics between the meta-stable state and an inherently damped control action.

Preferably, the vent structure 20 is a separate structure as illustrated in FIG. 3. This enables replacement sensor/vent components to be inserted into a pocket in the cell wall to replace damaged or defective sensor/vent components. Internal pressure in the cell seals the sensor/vent against the cell walls to seal against leakage. Sealing ridges may optionally be placed on the skirt 24 and on the inside surfaces of the cell walls to enhance sealing.

In another embodiment, the vent orifice in the sensor is comprised of several layers of a membrane material which allows sliding one relative to the other. Offset perforations in the two layers will generate variable vent orifices depending on the alignment of the perforations in the two layers. This embodiment provides a more continuous array of valve positions.

In one embodiment, the sensor vent valve allows a substantial amount of air to vent in the closed position to provide a constant air flow under the patient, thereby removing cooled liquids. For example, a vent orifice could vent 800 ml/min of air in the closed state and expand in the hot state to increase the vent air flow to 1400 ml/min.

In another embodiment, the air from the air supply 10 is heated above room temperature for combating hypothermia. Such hypothermia combating mattresses would use sensor/vent polymers with a different temperature response range than illustrated in FIG. 8. If the air in the mattress is to be heated above normal body temperatures, then the vent aperture 26 is biased to the open position and the expansion of polymers is used to close it.

The decubitus mat can be configured as a mat which is placed over an existing or conventional hospital mattress. Alternately, it can be incorporated into a mattress for hospital, nursing home, or home use. The mat can also be sized for wheelchair seats. As another application, the mat is configured and sized to overlay a surgical table to prevent pressure ulcers from being generated during surgery. The mat can also be configured and applied to conventional furniture to increase the comfort of healthy persons, particularly those spending a great amount of time in seated or prone positions. For example, the mat can be incorporated into airplane seats, car or truck seats, office chairs, and the like.

Having thus described the preferred embodiment, the invention is now claimed to be:

1. A mat comprising:
    an array of individual, air filled bladders
    a means responsive to body heat for adjusting contact pressure individually in the bladders, the heat responsive means including:
    a heat sensor and vent structure mounted on an exposed surface of each bladder, said heat sensor adapted to alter the volume of air escaping through said vent structure.

2. The mat as set forth in claim 1, wherein the sensor vent structure includes a confined polymer which expands under body heal, expansion and contraction of the polymer controlling a vent valve.

3. The apparatus as set forth in claim 2, wherein the vent valve includes a vent orifice that passes a lower air flow in a closed state and a higher air flow in an open state.

4. The mat as set forth in claim 2, wherein the sensor vent structure includes a plurality of flexible, sealed channels, each channel containing the polymer, the channels deforming as the polymer heats and expands to urge the vent valve open.

5. The mat as set forth in claim 4, wherein as the polymer expands, the channels create tensile forces that expand in one dimension and contract in another.

6. The mat as set forth in claim 4, wherein the channels are curved tubular arrays which generate tensile stresses in a direction which urges the vent valve to open.

7. The mat as set forth in claim 2, wherein the polymer undergoes a phase change between 20-35° C.

8. The mat as set forth in claim 7, wherein the phase change is a solid/liquid phase change, the polymer having minimal volume change with temperature in the solid state and the liquid state and undergoing significant volume change with the change in phase between the solid and liquid states.

9. The mat as set forth in claim 7, wherein the polymer has as sufficient heat capacity that the polymer changes from the solid phase to the liquid phase at a higher temperature than the polymer changes from the liquid phase back to the solid phase.

10. The mat as set forth in claim 1, further including an air supply which supplies air to the individual bladders.

11. The mat as set forth in claim 10, wherein the individual bladders, air supply lines, and metering orifices between the air supply lines and each bladder are formed of a thin flexible elastomeric material 12. The mat as set forth in claim 10, further including:
    a layer of an air permeable, compressible material which overlays the sensor/vent constructions to help distribute air from the vents around contacting body portions.

13. The mat as set forth in claim 10, further including an overlaying layer of a compressible material whose heat transfer characteristics increase under compression and decrease under expansion.

14. The mat as set forth in claim 1, wherein the mat is incorporated into one of a mattress, a wheelchair seat, an airplane seat, and seating furniture.

15. A method of supporting a subject while reducing a potential for pressure ulcers, the method comprising:
    supporting the subject on a plurality of air bladders;
    pressurizing each of the air bladders;
    sensing a temperature at a potential contact point on each bladder; and,
    responsive to the sensed temperature, adjusting a pressure in each bladder, inculding venting the bladders, the venting providing an air flow from the bladders along an underside of the subject to reduce pooled moisture.

16. The method according to claim 15, wherein the sensing step includes:
    a polymer expanding as it is heated toward a subject temperature and contracting as it is cooled toward an air temperature in the bladders.

17. The method as set forth in claim 16, wherein the polymer undergoes a phase change between the air supply temperature and the body temperature.

18. The method as set forth in claim 16, wherein the polymer undergoes a phase change between 20-35° C.

19. The method as set forth in claim 16, wherein the venting step includes:

biasing a normally closed vent valve open with the polymer as the polymer expands.

20. The method as set forth in claim 19, wherein as the polymer expands and vents the bladder, the bladder collapses and pulls away from the subject;
- as the bladder pulls away from the subject it is cooled by the cooling air and the polymer contracts closing the vent valve; and,
- as the vent closes, the bladder re-inflates and expands.

21. The method as set forth in claim 20, wherein the polymer has a sufficient heat capacity that the cell over deflates before the vent valve closes and over inflates before the vent valve opens to create a massaging action.

22. The method as set forth in claim 20, further including:
- overlaying the polymer layer with a material whose heat transfer characteristics improve with compression and diminish with expansion.

23. The method as set forth in claim 16, wherein the venting step includes:
- biasing a vent valve from a state in which it passes a lower air flow to a state in which it passes a higher air flow as the polymer expands.

* * * * *